United States Patent

[11] 3,572,507

| [72] | Inventor | John Juskevic<br>7265 Orchard Road, Dearborn, Mich.<br>48126 |
|---|---|---|
| [21] | Appl. No. | 823,708 |
| [22] | Filed | May 12, 1969 |
| [45] | Patented | Mar. 30, 1971 |

[54] CONTROL DEVICE FOR SELECTIVE DELIVERY OF A FLUID UNDER PRESSURE
12 Claims, 8 Drawing Figs.

| [52] | U.S. Cl. | 210/97,<br>210/340 |
|---|---|---|
| [51] | Int. Cl. | B01d 35/12 |
| [50] | Field of Search | 210/97,<br>108, 132, 340, 90 |

[56] References Cited
UNITED STATES PATENTS

| 3,244,283 | 4/1966 | Woods | 210/108 |
|---|---|---|---|
| 3,388,799 | 6/1968 | Armer | 210/108X |
| 3,397,784 | 8/1968 | Carr | 210/132X |
| 3,477,577 | 11/1969 | Florkowski | 210/108 |

*Primary Examiner*—John Adee
*Attorney*—William E. Johnson

ABSTRACT: The fluid control device functions to deliver fluid under pressure to a selected one of a pair of fluid processing units. The control device includes a movable piston which is displaceable when the pressure of the fluid flowing through a selected one of the processing units exceeds a predetermined pressure. When the displacement of the piston occurs, the fluid control device directs the fluid under pressure to be processed into the second of the pair of fluid processing units while closing off the first fluid processing unit.

Patented March 30, 1971
3,572,507
3 Sheets-Sheet 1
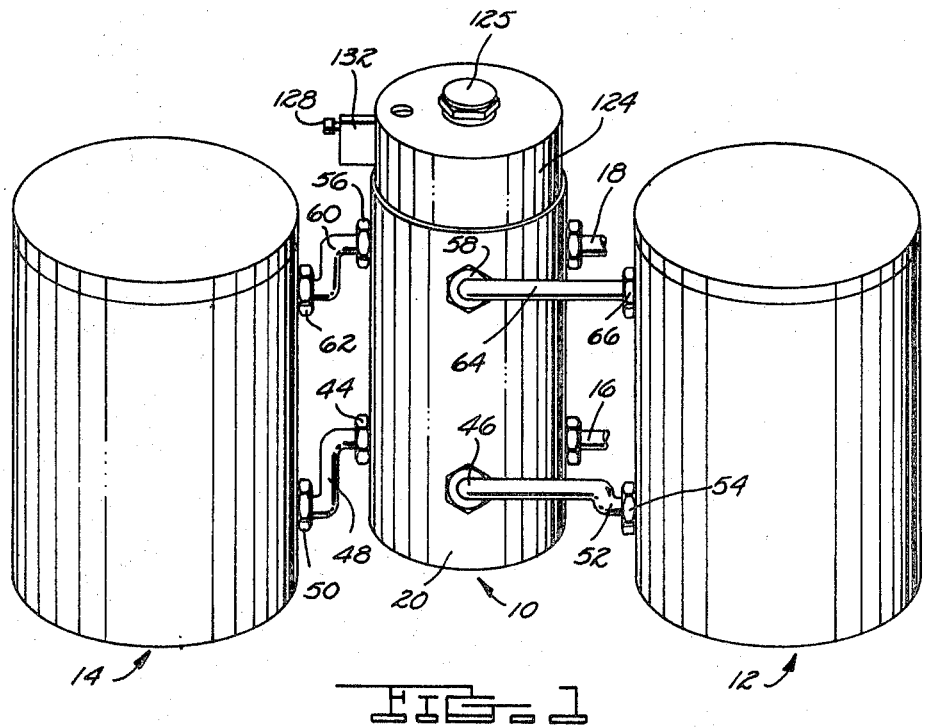
FIG. 1
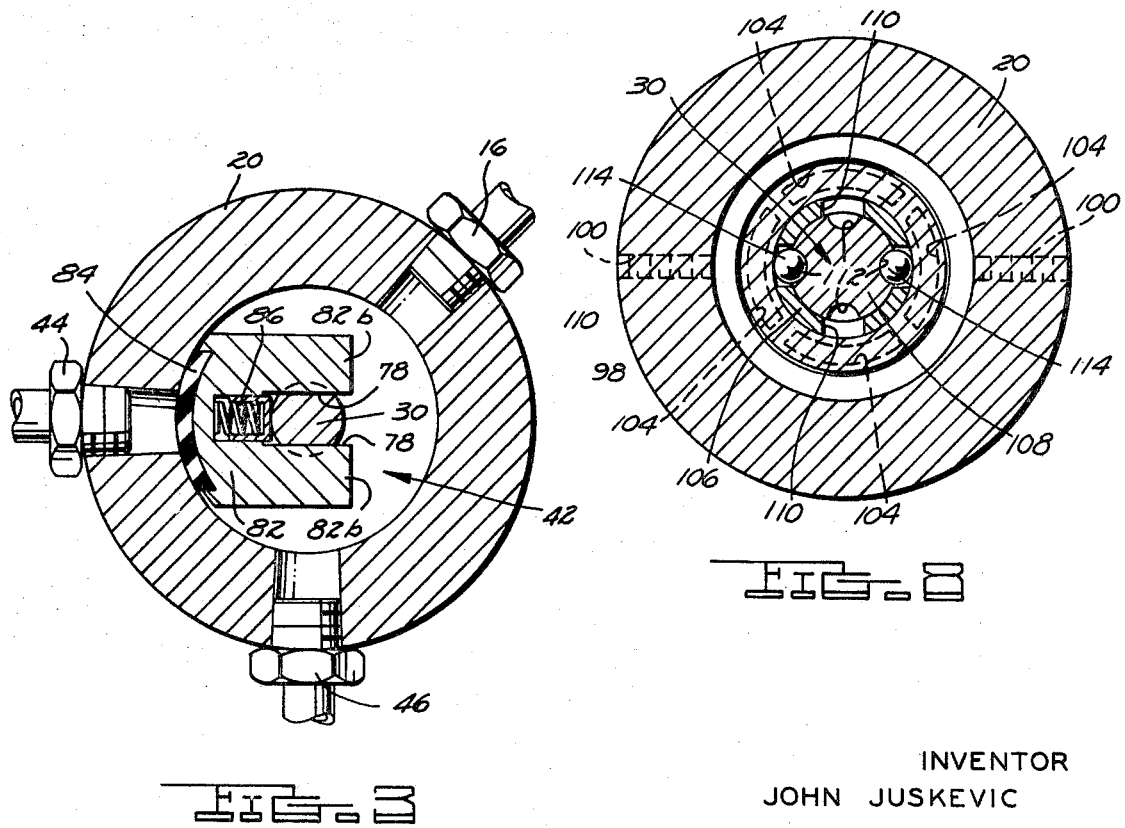
FIG. 3
FIG. 2
INVENTOR
JOHN JUSKEVIC

INVENTOR
JOHN JUSKEVIC

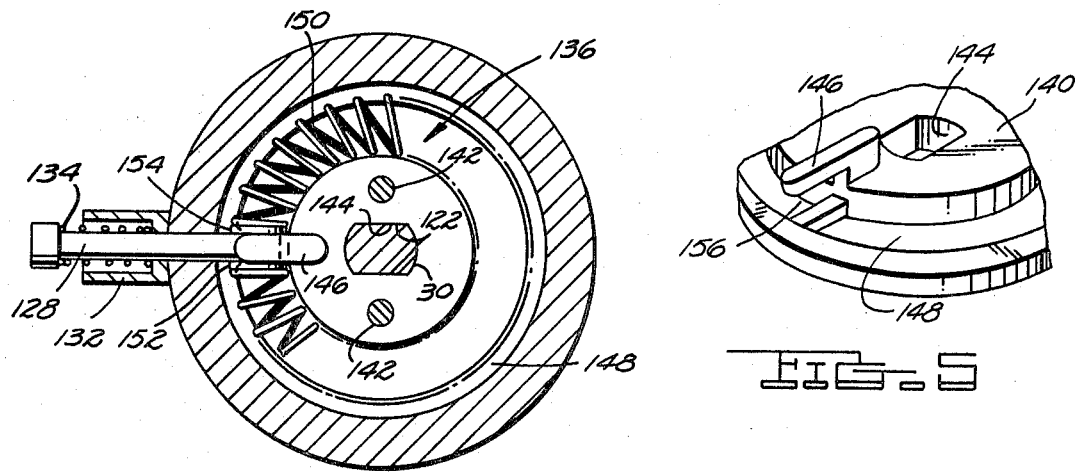
FIG. 4
FIG. 5
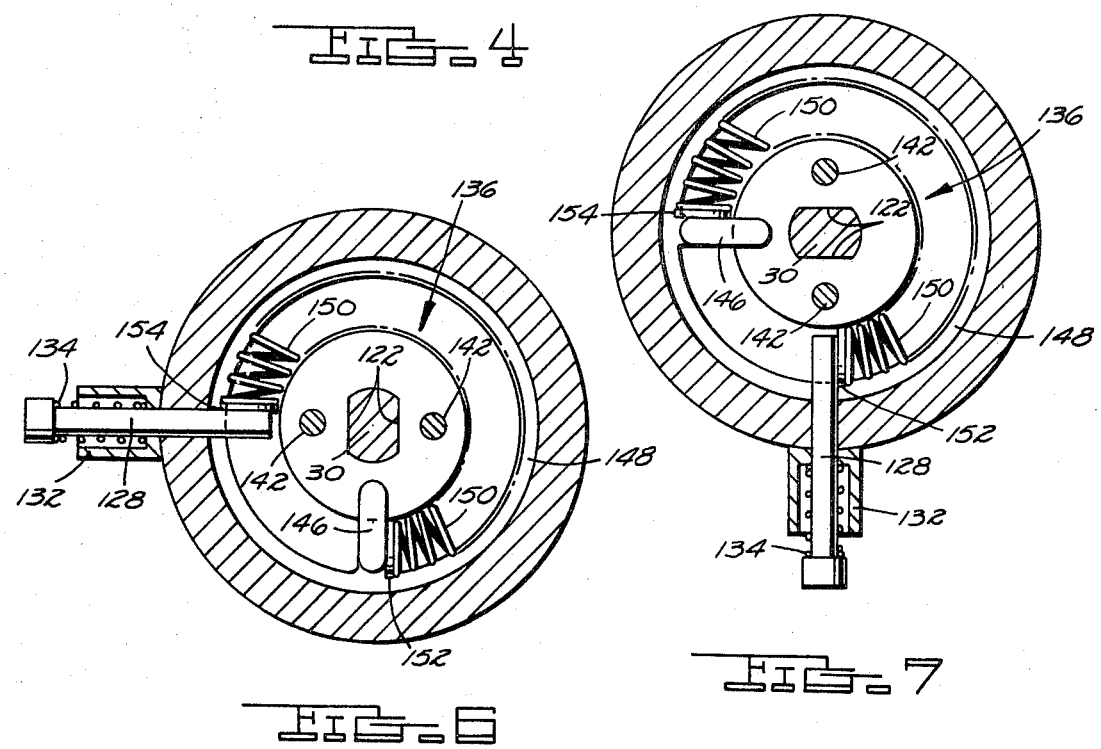
FIG. 6
FIG. 7
INVENTOR
JOHN JUSKEVIC

CONTROL DEVICE FOR SELECTIVE DELIVERY OF A FLUID UNDER PRESSURE

BACKGROUND OF THE INVENTION

Many fluid control devices are known in the prior art for controlling the selective delivery of a fluid under pressure to a particular one of a series of fluid processing units. This is particularly well known in the art of fluid filters employed in conjunction with a fluid control device. More particularly, when fluid filters employed with equipment for supplying hydraulic oils or cutter coolant oils to industrial machines become clogged up with impurities, the fluid control device switches the processing of the fluid to a different, clean filter.

Many of the prior art fluid control devices were required to be mounted directly within the fluid supply system in order to operate properly. This type of control device has a service disadvantage because of the confined areas within which service could be performed on the control device.

Other types of prior art fluid control devices could be mounted in a position remote from the supply system containing the fluid. These remote mounted type of units were easier to install and maintain than those devices mounted within the fluid supply system. However, the remote mounted, fluid control devices were generally of complex design in order to selectively switch the fluid being processed through the various units in accordance with a predetermined pressure level being reached in the processing unit through which the fluid was presently passing.

SUMMARY OF THE INVENTION

This invention relates to a control device for selective delivery of a fluid under pressure to one of at least a pair of fluid processing units and, more particularly, to such a control device which is responsive to an increase in pressure drop through the unit over a period of time fluid is directed through the unit.

In greater detail the basic elements forming the fluid control device of this invention are as follows. A fluidtight container contains therein a piston which is in sealing engagement with the interior sidewall of the container to divide the container into first and second fluid chambers. A first port defining means is located in fluidtight first fluid chamber to define both an exit port for the fluid and two connecting ports for separate connection with exit ports of respective ones of the exit ports of the two fluid processing units. Similarly, second port defining means are located in the second fluid chamber to define both an entrance port for the fluid under pressure and two connecting ports for separate connection with exit ports of respective ones of the entrance ports of respective ones of the two fluid processing units. Means are also provided within the fluidtight container for slidably receiving the piston between the ports defined in the upper and lower chambers, the sliding movement of the piston being in response to differences in fluid pressure in the two chambers.

Within the first and the second fluid chambers of the container, means are also provided for simultaneously sealing a connecting port in each chamber which connect respectively to the exit port and the entrance port of one of the fluid processing units. Means are also supplied for locating and sealing means within the fluidtight container which permits the passage of the fluid into the second chamber, into the one unsealed port to the entrance of the processing unit, through the processing unit, through the exit port of the processing unit and through the other unsealed port into the first chamber to be discharged therefrom through the first chamber's exit port. Operating means are provided which are selectively actuatable for changing the position of the locating means thereby to seal off the previously opened ports of the first and the second chambers and open the previously sealed ports of the first and the second chambers thereby permitting the fluid to flow through the second processing unit and not the first processing unit.

The operating element of the control device is a means responsive to a predetermined displacement of the piston within the fluidtight container in response to a pressure differential being established between the first and the second fluid chambers. This responsive means is for selectively actuating the operating means whereby the locating means changes the position of the sealing means in each of the chambers and the fluid passing through the control device is now directed for processing to the second fluid processing unit.

BRIEF DESCRIPTION OF THE DRAWINGS

FIG. 1 is an isometric view of the fluid control device of this invention in association with a pair of fluid processing units.

FIG. 3 is a cross section view taken along line 3-3 of FIG. 2 showing the details of the sealing means of the control device.

FIG. 4 is a cross section view taken along line 4-4 of FIG. 2 showing the details of the means for operating the sealing means of the control device.

FIGS. 5, 6 and 7 show further details of the operating means of FIG. 4.

FIG. 8 is a cross section view taken along line 8-8 of FIG. 2 showing the details of the means for actuating the operating means.

DESCRIPTION OF THE PREFERRED EMBODIMENT

CONSTRUCTION

Figure 2:
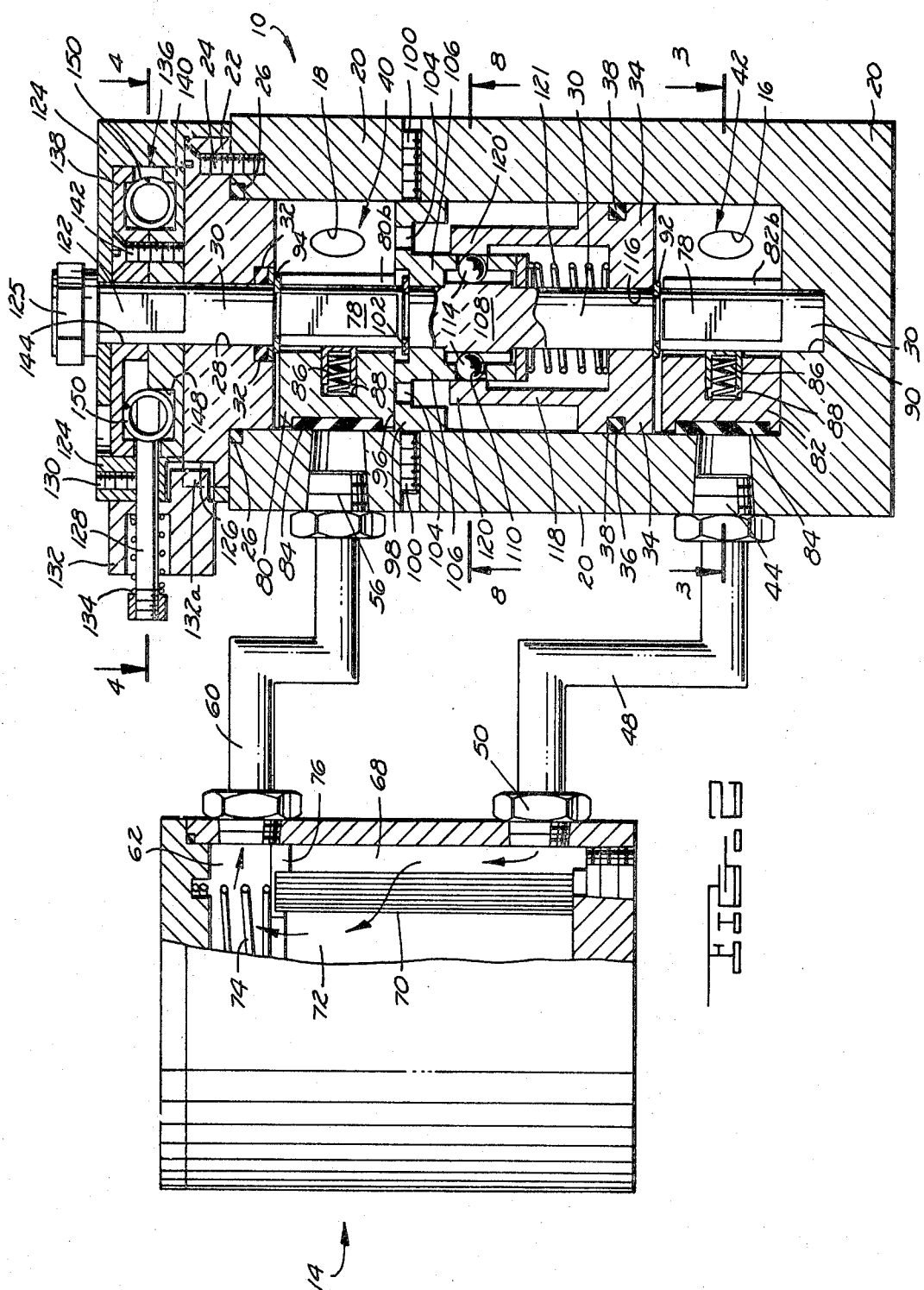
FIG. 2 is an elevational view, partly in cross section, showing the details of the control device and one of the fluid processing units.

In FIG. 1 there is seen the control device for selective delivery of a fluid under pressure and is generally identified by the numeral 10. The device connects fluid under pressure to one of two fluid processing units generally identified by the numerals 12 and 14 respectively. The units can be, for example, oil filters.

Fluid from the discharge side of a pump (not shown) is delivered to an entrance port 16 in the lower portion of the control device. The fluid is then discharged from one exit port 18 in the upper portion of the control device to the vacuum side of the pump. During the fluid's passage from the entrance port to the exit port of the control device, the fluid is passed through either one or the other of the fluid processing units 12 or 14. The exact manner of passage of the fluid through the processing units will best be understood by reference to both FIGS. 1 and 2.

The control device 10 is formed principally by a cylindrical container 20 which is covered by a top 22 (FIG. 2) held in position by screws 24 (one shown in FIG. 2). A sealing ring 26 insures a tight seal between the top and the container. The top also has an axial opening 28 through which a portion of a shaft 30 passes. The purpose of the shaft 30 will be explained in greater detail subsequently. An O-ring 32 forms a fluid seal between the shaft 30 and the top 22.

A piston 34 (FIG. 2) is mounted within the container 20. The piston has a circumferential groove 36 which supports a sealing ring 38. The piston effectively divides the control device 10 into upper and lower fluid chambers respectively designated by the general numerals 40 and 42. The piston 34 is slidably mounted on the shaft 30, and as will be explained in greater detail later in this specification, the movement of the piston is in response to a difference in fluid pressure existing between the fluid chamber 40 and 42.

Now with particular reference to FIGS. 2 and 3, the various ports formed in the upper and lower fluid chambers 40 and 42 will be explained in detail. In the lower chamber 42 (FIG. 3) the entrance port for the fluid has already been described. The lower chamber also contains two connecting ports respectively designated 44 and 46. As seen in FIG. 1, connecting port 44 is connected by a fluid line 48 to an entrance port 50 of the processing unit 14. Similarly, connecting port 46 is connected by a fluid line 52 to entrance port 54 of the processing unit 12.

In the upper fluid chamber 40, the fluid exit port 18 has already been explained. The upper chamber also contains two connecting ports respectively designated 56 and 58 (FIG. 1). Connecting port 56 is connected by a fluid line 60 to a discharge port 62 of the processing unit 14. Similarly, connecting port 58 is connected by a fluid line 64 to a discharge port 66 of the processing unit 12. The ports 58 and 46 are not seen in FIG. 2.

In the case of the preferred embodiment structure, each of the processing units 12 and 14 are formed in the same manner and are oil filters. As best seen in FIG. 2, fluid flowing through entrance port 50 of the unit 14 passes into a first chamber 68 which is sealed from the exit of the unit. The fluid must then flow through a filter element 70 where residue in the fluid is trapped. After passing through the filter, the fluid enters another chamber 72 which permits passage of the fluid out of the discharge port 62 of the unit. A spring 74 and a sealing unit 76 are used in conjunction with the filter 70 to form the separate chambers 68 and 72.

Thus, in the construction as described to this point, a connecting port in both the upper and the lower fluid chambers are provided for each of the fluid processing units. The connecting ports 44 and 56 are vertically aligned and connected to the unit 14. The connecting ports 46 and 58 are also vertically aligned and connected to the unit 12. The means for simultaneously sealing an aligned pair of ports to seal off one of the processing units is best understood by reference to FIGS. 2 and 3.

In FIGS. 2 and 3, flats 78 are shown as being formed on the shaft 30 at positions in both the upper and the lower fluid chambers 40 and 42. A pair of sealing elements, respectively designated 80 and 82, are respectively associated with the flats formed on the upper and the lower portions of the shaft 30. One end of each of the sealing elements is bifurcated at 80b and 82b as best shown in FIG. 3, to partially enclose the associated flats formed on the shaft. The other ends of the sealing elements have sealing material 84 therein for sealing the ports the elements are associated with.

Each of the sealing elements 80 and 82 have associated therewith a spring and cap arrangement 86 acting between the end of a hollowed out portion 88 of each of the members and the associated portion of the shaft 30. This biasing action insures that the ports are properly sealed by the sealing material supported on the sealing elements.

The lower portion of the central shaft 30 (FIG. 2) is seated in a recess 90 formed in the bottom of the container 20. The lower sealing element 82 moves with rotation of the shaft and is held against upward movement in the lower fluid chamber 42 by means of a C-ring 92 encircling the shaft 30. The upper sealing element 80 also moves with rotation of the shaft 30 and is held in proper position by a C-ring 94 and the upper surface 96 of a stationary member 98. The stationary member is held in position in the cylindrical container 20 by means of a pair of set screws 100. Another C-ring 102 locates the shaft 30 with respect to the stationary member 98.

The stationary member 98 performs an important function in the operation of the control device 10 and therefore has several features. The first important feature is four spaced openings 104 therein which permit pressure from the upper chamber 40 to be applied to one side of the piston 34.

As best seen in FIGS. 2 and 8, the stationary member 98 also has a downwardly depending portion 106 which encircles a portion 108 of the shaft 30 (FIG. 8). The depending portion has four openings 110 therein extending laterally along a portion of the length of the shaft 30. These openings 110 are associated with recesses 112 formed in the shaft portion 108. A pair of balls 114 are received in the openings 110 and 112 to lock the shaft 30 against rotational movement with respect to the stationary member 98.

The piston 34 has an axial opening 116 (FIG. 2) which permits it to move up and down on the shaft 30. The piston also has an upwardly extending collar portion 118 encircling the shaft 30 which terminates in a portion 120 which encircles the balls 114 when the portion 120 is in a normal position. In the normal position as shown in FIG. 2, the encircling portion 120 holds the balls 114 in the associated recesses 112 of the shaft which results in a locking of the shaft to the stationary member 98. A spring 121 acts between the piston 34 and the depending portion 106 of the stationary member 98 to keep the piston in its normal position.

The manner in which the sealing elements 80 and 82 are located within the fluidtight container 10 is as follows and is best shown in FIG. 2, and 4 to 7. As seen in FIG. 2, a pair of flats 122 are formed on the upper portion of the shaft 30. These locating flats 122 are aligned with the flats 78 formed on the shaft 30 in the upper and the lower fluid chambers 40 and 42, respectively. A movable member or cap 124 is secured to the upper portion of the shaft 30 by a bolt 125.

As best seen in FIG. 2, a recess 126 is formed on the top 22 of the container 10 at two positions vertically aligned with the connecting ports to the respective fluid processing units 12 and 14. Only one recess 126 is shown in FIG. 2. A rod 128 is secured to the movable member 124 by a set screw 130 so that the rod is movable with the member. The rod 128 has associated and supported thereby a setting member 132. A spring 134 acts between the setting member and the rod. When the lower portion 132a of the setting member is received in the recess 126 in the top 22, the sealing elements 80 and 82 are aligned with respective ones of the connecting ports for one of the fluid processing units, in FIG. 2 for the processing unit 14.

The setting member 132 is interconnected and functions with the shaft 30 as follows. This interconnection will best be understood by reference to FIGS. 2 and 4—7. A circular shaped, spring holding element, generally designated by the numeral 136 is formed of an upper member 138 and a lower member 140 secured together by screws 142. The element 136 has a central axil opening 144, best seen in FIG. 5, which is receivable on the flats 122 at the top of the shaft 30 so that the spring holding element 136 is both secured to and rotatable with the shaft. The element 136 is held in position over the shaft by means of the overlying movable member 124 and the bolt 125.

As best seen in FIGS. 5 through 7, the spring holding element 136 has an upstanding, U-shaped member 146 formed in the lower member 140 thereof. The U-shaped member is aligned with the flats 122 formed on the shaft 30 and thereby aligned also with the sealing elements 80 and 82. When the upper and the lower members of the element 136 are assembled, a circumferential groove 148 is defined around the element. The U-shaped member extends into and blocks a portion of the groove 148. A coil spring has, as seen in FIG. 4, one end 152 thereof in engagement with the lower portion of the U-shaped member 146 while the other end 154 thereof is in engagement with the upper portion of the U-shaped member.

In an inoperative condition, the rod 128 supported on the movable member 124 extends into an open space 156 (FIG. 5) of the U-shaped member 146. However, movement of the movable member causes the rod to engage one or the other of the ends of the coil spring 150 and compress the same as shown in either FIG. 6 or FIG. 7.

The operation of the control device 10 of this invention for delivering fluid to one of the two fluid processing units 12 and 14 will now be described in detail.

As shown in FIGS. 1 and 2, the control device 10 is in an inactive position after having switched the flow of fluid from being processed through the unit 14 to present processing through the unit 12. In order to accomplish the change in processing units, a series of steps would have to have occurred. These steps will be described in detail below.

With particular reference to FIG. 6, in order for the control unit 10 to deliver the fluid to the processing unit 14, the shaft 30 would have to be aligned as shown in that FIG. To cause this alignment, the U-shaped member 146 of the spring holding element 136 is shifted into alignment with the aligned connecting ports 58 and 46 of the device 10. Once the shaft is set, setting member 132 is moved outwardly with respect to the rod 128 against the bias of the spring 134 and then the member is shifted 90° to relocate its portion 132a in the recess 126 of the top 22 aligned with the connecting ports 44 and 56 to the unit 14. As best seen in FIG. 6, the action also causes the rod 128 to act on the end 154 of the spring 150 to compress the same in its circumferential groove 148.

Once the shaft 30 has been placed in this position, the sealing elements 80 and 82 are respectively associated with the connecting ports 46 and 58, respectively, in the lower fluid chamber 42 and the upper fluid chamber 40. In this situation, fluid entering the entrance port 16 of the control device 10 is passed through the connecting port 44 of the lower fluid chamber 42, through the fluid line 48, the entrance port 50 of the processing unit 14 and into the chamber 68 thereof. The fluid is then cleaned of metal particles or dirt as it passes through the filter 70 and into the second chamber 72 of the unit 14. The fluid then flows out the discharge port 62, through the fluid line 60, the connecting port 56 and into the upper fluid chamber 40 of the control device 10 to be discharged therefrom through the exit port 18 to the vacuum side of the pump (not shown).

Throughout the passage of the fluid through the upper and the lower fluid chambers, respectively 40 and 42, a pressure is applied on both sides of the piston 34 which, as previously described, is mounted for movement on the shaft 30 within the container 20. The greatest pressure on the piston is always in the lower chamber 42 for this is the chamber in which the fluid is received from the discharge side of the pump and is also the contaminated fluid. Because of the higher pressure in the lower chamber, the calibrating spring 121 (FIG. 2) is provided between the stationary member 98 and the piston to hold the piston in a normal position and also to return the piston to a normal position after the operation of the control device. The pressure of the upper chamber is placed on one side of the piston because of the openings 104 in the stationary member 98.

As the fluid is processed through the unit 14, the filter element 70 thereof collects dirt and other contaminants which cause a greater pressure drop through the filter. The increase in pressure drop through the filter also causes an increase in pressure in the lower chamber 42 and a decrease in pressure in the upper chamber 40. The differential in pressure between the two chambers, as it increases, causes the piston 34 to be moved upwardly against the bias of the spring 121. As the piston moves upwardly towards the stationary member 98, the ball encircling portion 120 thereof finally moves out of contact with the balls 114 held in the openings 110 and the recesses 112 (see FIG. 8) respectively of the depending portion 106 of the stationary member 98 and the shaft portion 108 of the shaft 30.

When the above-described action takes place, the spring 150, which has been compressed as previously described in conjunction with FIG. 6, forces the balls 114 out of the shaft recesses 112 in which they are presently seated and fully into the openings 110 of the depending portion 106 of the stationary member 98. This action causes the shaft 30 to be rotated by the action of the spring 150 from the position the shaft occupies in FIG. 6 to the position the shaft occupies in FIG. 4. When the FIG. 4 position has been achieved, the spring 121 once again forces the piston 34 to its normal position whereby the balls 114 once again become engaged in an associated pair of the recesses 112 in the shaft 30 because of the resumed contact therewith of the encircling portion 120 of the piston 34.

This newly achieved condition is shown in FIG. 2. In such a condition, the fluid entering entrance port 16 of the control device 10 would be delivered to the processing unit 12 through the connecting port 46, the fluid line 52, and the entrance port 54. After processing in the unit 12, the fluid would be redelivered therefrom through the discharge port 66, the fluid line 64, and the connecting port 58. The fluid would then pass through the upper chamber 40 and be discharged from the exit port 18 of the control device 10.

Since the processing unit 14 has now been sealed off by the sealing elements 80 and 82 respectively closing the connecting ports 56 and 44, the filter element 70 of the unit 14 may be either changed or cleaned. During the cleaning of the unit 14, the unit 12 is in operation so no interruption is experienced in fluid flow through the control device.

Once the unit 14 has been cleaned, the device 10 may be reset to automatically switch from the processing unit 12 when it becomes dirty enough to cause a pressure differential between the two fluid chambers substantial enough to cause upward movement of the piston 34 in the device 10 to release the balls 114. This automatic switching is best understood by reference to FIG. 7. The setting member 132 is again moved outwardly with respect to the rod 128 against the bias of the spring 134 and then shifted 90° counterclockwise as viewed in FIG. 7. This action relocates the portion 132a of the setting member 132 in a recess (not shown) in the top 22, which recess is aligned with the connecting ports 58 and 46 of the unit 12. As best seen in FIG. 8, this action also causes the rod 128 to once again act on the end 152 of the spring 150 to compress the same in its circumferential groove.

Thus, once again the conditions are established that when a sufficient pressure differential exists on the sides of the piston 34, the balls 114 will be released from locking engagement with the shaft 30 and the shaft will turn to permit processing of the fluid once again through the unit 14 while the processing unit 12 is being serviced. The action of switching between the two units may be continuously repeated.

Thus, a preferred embodiment of the invention has been described in detail. The invention is defined in the appended claims.

I claim:

1. A control device for selective delivery of a fluid under pressure to one of at least a pair of filter units which process the fluid, the processing of the fluid in any one of the filter units over a period of time increasing the pressure drop of the fluid passing through the filter unit, the control device comprising:
   a fluidtight container;
   a piston within said fluidtight container for dividing said container into first and second fluid chambers;
   first port defining means in said first fluid chamber for defining both an exit port for the fluid and two connecting ports for separate connection with exit ports of respective ones of the exit ports of the two fluid processing units;
   second port defining means in said second fluid chamber for defining both an entrance port for the fluid and two connecting ports for separate connection with the entrance ports of respective ones of the entrance ports of the two fluid processing units;
   means for slidably receiving said piston member between said first and said second port defining means in each of said chambers, said slidable movement being in response to differences in fluid pressure in said two chambers;
   means for simultaneously sealing a connecting port in both said first and said second fluid chambers which connect respectively to said exit port and said entrance port of one of the fluid processing units;
   means for locating said sealing means within said fluidtight container for permitting the passage of the fluid into said second fluid chamber, into said one unsealed port of the entrance of the processing unit, through the processing unit, through the exit port of the processing unit and through the other unsealed port into said first chamber to be discharged therefrom through said first chamber's exit port;
   operating means selectively actuatable for changing the position of said locating means to seal off the previously opened ports of said first and said second chambers and open the previously sealed ports of said first and said second chambers thereby permitting the fluid to flow through the second processing unit and not the first processing unit; and means responsive to a predetermined displacement of said piston within said fluidtight container in response to a pressure differential being established between said first and said second chambers for selectively actuating said operating means whereby said locating means changes the position of said sealing means in each of said chambers and the fluid passing through the control device is now directed for processing to the second fluid processing unit.

2. The control device for the selective delivery of fluid under pressure to at least one of a pair of filter units which process the fluid as defined in claim 1 wherein: said first and said second port defining means locate said entrance and said exit ports to each of the respective ones of the processing units in substantial alignment between said first and said second fluid chambers.

3. The control device for the selective delivery of fluid under pressure to at least one of a pair of filter units which process the fluid as defined in claim 2 wherein: said fluidtight container has a cylindrical interior; and wherein said entrance and said exit ports defined in each of said chambers by said first and said second port defining means are both substantially aligned with and arcuately spaced from one another in both said first and said second chambers.

4. The control device for the selective delivery of fluid under pressure to at least one of a pair of filter units which process the fluid as defined in claim 3 wherein: said means for slidably mounting said piston comprises a central shaft extending along the axis of said cylindrical interior of said fluid tight container; means defining a central axil bore through said piston sized to sealingly encircle a portion of said shaft; and a retainer means for preventing movement of said piston to a position which would seal any of said ports defined by said second port defining means in said second said fluidtight chamber.

5. The control device for the selective delivery of fluid under pressure to at least one of a pair of filter units which process the fluid as defined in claim 4 wherein: said central shaft extends from the bottom of said container to the top of said container with the shaft's axis in substantial alignment with the axis of said cylindrical container; wherein the bottom end of said shaft is seated for rotation in the bottom wall of said second fluid chamber and wherein the top end of said shaft is in operative association with said operating means actuatable for selectively changing the location of said sealing means.

6. The control device for the selective delivery of fluid under pressure to at least one of a pair of filter units which process the fluid as defined in claim 5 wherein: said means for simultaneously sealing a connecting port in both said first and said second fluid chambers connected respectively to said exit and entrance ports of one of the fluid processing units comprises; a pair of aligned flat surfaces formed on said central shaft at positions vertically located in both said upper and lower chambers; and a pair of sealing elements, one associated with each pair of flat surfaces on said shaft, each of said sealing elements both being bifurcated at one end to permit them to partially enclose said associated flat surfaces of said shaft and being arcuately shaped at the other end to form a surface both conforming to the shape of the interior wall of said chamber and being larger than said connecting ports formed in each of said chambers.

7. The control device for the selective delivery of fluid under pressure to at least one of a pair of filter units which process the fluid as defined in claim 6 wherein: each of said sealing members has a biasing element acting between said member and said central shaft for biasing said other end of said sealing member into engagement with said connecting ports, and wherein the other end of each of said sealing members has a sealing material associated therewith for positively sealing said connecting port it is associated with.

8. The control device for the selective delivery of fluid under pressure to at least one of a pair of filter units which process the fluid as defined in claim 7 wherein: said locating means for locating said sealing means within said fluidtight container comprises; a locating surface on said portion of said shaft extending outwardly from the top of said fluidtight container, said locating surface being aligned with said flats on said shaft, a movable member associated with said locating surfaces on said extending portion of said shaft; locating recesses in said top surface of said container, each recess being aligned with a pair of said connecting ports for a respective one of the fluid processing units in said upper and said lower chambers; and means interconnecting said shaft and said movable member for positioning said movable member in one of said recesses to align said sealing members with one of said pair of connecting ports for a fluid processing unit.

9. The control device for the selective delivery of fluid under pressure to at least one of a pair of filter units which process the fluid as defined in claim 8 wherein: said means for interconnecting said shaft and movable member comprises: a circular shaped, spring holding member having an axil opening therethrough positioned adjacent and movable with said locating surface on said portion of said shaft extending outwardly from the top of said fluidtight container, said spring holding member having a circumferential groove there around, and means both in part secured to said movable member and extending into said recess of said spring holding member and in part movable outwardly with respect to said movable member, said outward moving member supporting thereon a detent which enters one of said recesses of the top portion of said fluidtight container thereby to position said sealing means associated with an associated pair of connecting ports to one of said fluid processing units.

10. The control device for the selective delivery of fluid under pressure to at least one of a pair of filter units which process the fluid as defined in claim 9 wherein: said operating means comprises a U-shaped member partially enclosing said circumferential groove around said spring holding member; said U-shaped member being positioned in said spring holding member in such a position as to receive therewithin the portion of said means secured to said movable member and extending into said circumferential groove; and a coil spring enclosed within and encircling said circumferential groove with the ends of said spring abutting said U-shaped member to act as stop members; said operating means being moved to an operative position by resetting of said outwardly movable member in a different one of said recesses associated with said top of said container which causes compression of said spring by said means extending into said circumferential groove while said means for selectively actuating said operating means is in an unactuated state.

11. The control device for selective delivery of fluid under pressure to at least one of a pair of filter units which process the fluid as defined in claim 10 wherein: said means for selectively actuating said operating means comprises: a stationary member mounted in said fluidtight container above said piston and below said first port defining means, said stationary member having (1) a plurality of opening therethrough so that the fluid pressure of said first chamber may be applied to one side of said piston, (2) an axil opening therethrough to permit passage of said central shaft therethrough and (3) a downwardly extending flange encircling said shaft, said flange having at least four ball receiving openings therein; means on said central shaft adjacent said downwardly extending flange encircling said shaft defining at least four ball receiving recesses therein; a pair of balls received in opposed recesses and openings respectively in said shaft and said flange; and means associated with said piston and extending upwardly to encircle said balls held in said openings and said shaft recesses when said piston is in a normal position.

12. The control device for selective delivery of fluid under pressure to at least one of a pair of filter units which process the fluid as defined in claim 11 wherein said fluid processing units are oil filters.